US011323361B2

(12) United States Patent
Kondapavuluru et al.

(10) Patent No.: US 11,323,361 B2
(45) Date of Patent: *May 3, 2022

(54) GRE TUNNELING WITH REDUCED PACKET ENCRYPTION AT INTERMEDIATE ROUTERS USING LOOSE SOURCE ROUTING

(71) Applicant: Juniper Networks, Inc., Sunnyvale, CA (US)

(72) Inventors: Goutham Kondapavuluru, Bangalore (IN); Ramesh Biradar, Bangalore (IN); Indrakumar M, Bangalore (IN); Sharanagoud B. Devaraddi, Bangalore (IN); Vijay Sai Ram Paruchuri, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/948,661

(22) Filed: Sep. 28, 2020

(65) Prior Publication Data

US 2021/0092054 A1 Mar. 25, 2021

Related U.S. Application Data

(63) Continuation of application No. 16/577,538, filed on Sep. 20, 2019, now Pat. No. 10,805,210.

(51) Int. Cl.
*G06F 15/16* (2006.01)
*H04L 45/00* (2022.01)
*H04L 29/06* (2006.01)
*H04L 69/22* (2022.01)
*H04L 47/70* (2022.01)

(52) U.S. Cl.
CPC ............ *H04L 45/34* (2013.01); *H04L 47/825* (2013.01); *H04L 63/0435* (2013.01); *H04L 69/22* (2013.01)

(58) Field of Classification Search
CPC ..... H04L 12/4633; H04L 69/22; H04L 45/34; H04L 47/825; H04L 63/0435
USPC ........................................................ 709/223
See application file for complete search history.

(56) References Cited

U.S. PATENT DOCUMENTS

| 6,115,384 | A  | * | 9/2000  | Parzych  | H04L 29/06 370/401 |
| 7,882,247 | B2 | * | 2/2011  | Sturniolo | H04W 12/03 709/228 |
| 9,215,075 | B1 | * | 12/2015 | Poltorak | H04L 63/04 |

(Continued)

*Primary Examiner* — Hamza N Algibhah
(74) *Attorney, Agent, or Firm* — Harrity & Harrity, LLP

(57) ABSTRACT

A network node may receive a packet having an inner internet protocol (IP) header and an outer IP header. The inner IP header may be encrypted. A loose source routing (LSR) field of the outer IP header may identify a recipient address. The network node may determine, based on the recipient address identified in the LSR field, a tunnel endpoint associated with a receiving network node. The network node may update the outer IP header of the packet to obtain an updated packet with an updated outer IP header. A source address of the updated outer IP header may be updated to a tunnel endpoint associated with the network node, and the destination address of the updated outer IP header may be updated to a tunnel endpoint associated with the receiving network node. The network node may route the updated packet according to the updated outer IP header.

20 Claims, 10 Drawing Sheets

100

(56) References Cited

U.S. PATENT DOCUMENTS

| | | | |
|---|---|---|---|
| 10,805,210 B1 | 10/2020 | Kondapavuluru et al. | |
| 11,012,259 B1* | 5/2021 | McConnaughay | H04L 67/1002 |
| 2003/0182431 A1* | 9/2003 | Sturniolo | H04L 63/20 709/227 |
| 2004/0267874 A1* | 12/2004 | Westberg | H04L 63/0272 709/200 |
| 2006/0045004 A1* | 3/2006 | Charzinski | H04L 45/28 370/216 |
| 2010/0265950 A1* | 10/2010 | Foxworthy | H04L 12/4633 370/392 |
| 2011/0016209 A1* | 1/2011 | Moncaster | H04L 47/11 709/224 |
| 2013/0329728 A1* | 12/2013 | Ramesh | H04J 3/24 370/390 |
| 2014/0086253 A1* | 3/2014 | Yong | H04L 45/50 370/395.53 |
| 2014/0310427 A1* | 10/2014 | Shaw | H04L 61/2007 709/244 |
| 2014/0369181 A1* | 12/2014 | Nakada | H04L 69/08 370/218 |
| 2016/0028625 A1* | 1/2016 | Hari | H04L 45/74 370/392 |
| 2016/0119054 A1* | 4/2016 | Foxworthy | H04B 7/18513 370/319 |
| 2016/0315920 A1* | 10/2016 | Kurmala | H04L 63/0471 |
| 2017/0063783 A1* | 3/2017 | Yong | H04L 67/2814 |
| 2018/0146413 A1* | 5/2018 | Wetterwald | H04L 45/14 |
| 2019/0007211 A1* | 1/2019 | Chunduri | H04L 9/0656 |
| 2019/0068496 A1* | 2/2019 | Tessmer | H04L 12/413 |
| 2019/0223062 A1* | 7/2019 | Kant | H04L 45/302 |
| 2019/0230201 A1* | 7/2019 | Oeder | H04L 69/22 |
| 2019/0245787 A1* | 8/2019 | Skalecki | H04L 43/0882 |
| 2019/0268421 A1* | 8/2019 | Markuze | H04L 67/141 |
| 2020/0007517 A1* | 1/2020 | Spahn | H04L 63/0485 |
| 2020/0059459 A1* | 2/2020 | Abraham | H04L 12/4641 |
| 2020/0067731 A1* | 2/2020 | Fu | H04L 12/4641 |
| 2020/0084147 A1* | 3/2020 | Gandhi | H04L 69/22 |
| 2020/0106641 A1* | 4/2020 | Kommula | H04L 45/72 |
| 2020/0213152 A1* | 7/2020 | Choquette | H04L 12/4633 |

* cited by examiner

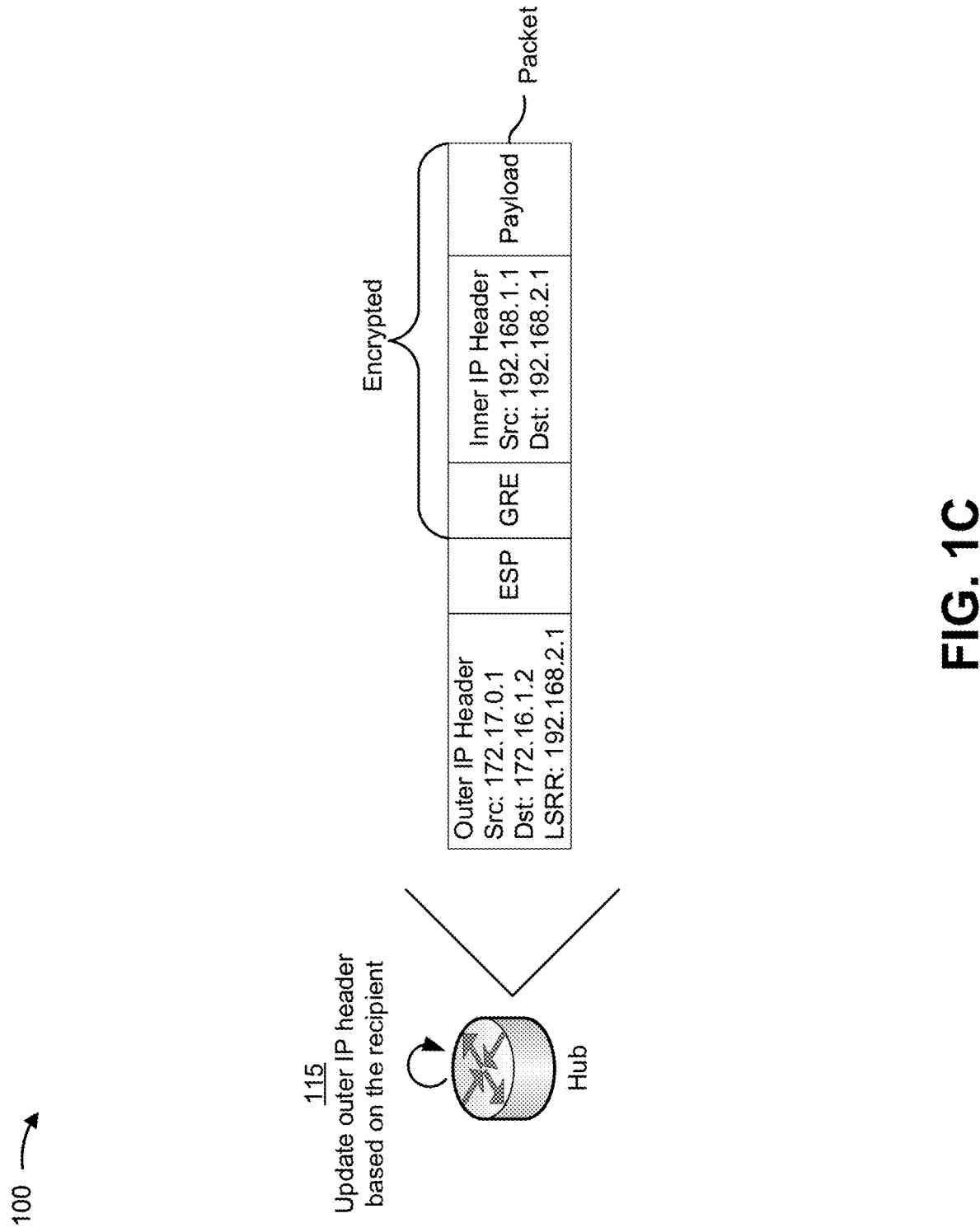

400 →

```
┌─────────────────────────────────────────────────────────────────┐
│  Receive a packet having an inner internet protocol (IP) header and an  │
│  outer IP header, wherein a source address of the inner IP header       │── 410
│  identifies a sender address, and a destination address of the inner IP │
│  header identifies a recipient address, wherein the inner IP header is  │
│  encrypted, wherein a source address of the outer IP header identifies a│
│  tunnel endpoint associated with a transmitting network node, a         │
│  destination address of the outer IP header identifies a tunnel endpoint│
│  associated with an intermediate network node, and a loose source       │
│  routing (LSR) field of the outer IP header identifies the recipient address│
└─────────────────────────────────────────────────────────────────┘
                                  ↓
┌─────────────────────────────────────────────────────────────────┐
│  Determine, based on the recipient address identified in the LSR field of│── 420
│  the outer IP header, a tunnel endpoint associated with a receiving     │
│  network node                                                            │
└─────────────────────────────────────────────────────────────────┘
                                  ↓
┌─────────────────────────────────────────────────────────────────┐
│  Update the outer IP header of the packet to obtain an updated packet   │
│  with an updated outer IP header, wherein the source address of the     │── 430
│  updated outer IP header is updated to the tunnel endpoint associated   │
│  with the intermediate network node, and the destination address of the │
│  updated outer IP header is updated to the tunnel endpoint associated   │
│  with the receiving network node                                         │
└─────────────────────────────────────────────────────────────────┘
                                  ↓
┌─────────────────────────────────────────────────────────────────┐── 440
│  Route the updated packet according to the updated outer IP header      │
└─────────────────────────────────────────────────────────────────┘
```

510 — Receive a packet having an inner internet protocol (IP) header and an outer IP header, wherein a source address of the inner IP header identifies a sender address, and a destination address of the inner IP header identifies a recipient address, wherein the inner IP header is encapsulated by a Generic Routing Encapsulation (GRE) header, the GRE header is encapsulated by an Encapsulating Security Payload (ESP) header that provides encryption, and the ESP header is encapsulated by the outer IP header, wherein a source address of the outer IP header identifies a tunnel endpoint associated with a transmitting network node, a destination address of the outer IP header identifies a tunnel endpoint associated with an intermediate network node, and a loose source routing (LSR) field of the outer IP header identifies the recipient address

520 — Determine, based on the recipient address identified in the LSR field of the outer IP header, a tunnel endpoint associated with a receiving network node

530 — Update the outer IP header of the packet to obtain an updated packet with an updated outer IP header, wherein the source address of the updated outer IP header is updated to the tunnel endpoint associated with the intermediate network node, and the destination address of the updated outer IP header is updated to the tunnel endpoint associated with the receiving network node

540 — Route the updated packet according to the updated outer IP header

```
┌─────────────────────────────────────────────────────────────┐
│ Receive a packet having an inner internet protocol (IP) header and an │
│ outer IP header, wherein a source address of the inner IP header    │──610
│ identifies a sender address, and a destination address of the inner IP │
│ header identifies a recipient address, wherein the inner IP header is │
│ encrypted, wherein a source address of the outer IP header identifies a │
│ tunnel endpoint associated with a transmitting network node, a       │
│ destination address of the outer IP header identifies a tunnel endpoint │
│ associated with an intermediate network node, and a field of the outer IP │
│ header identifies the recipient address                              │
└─────────────────────────────────────────────────────────────┘
                              │
                              ▼
┌─────────────────────────────────────────────────────────────┐
│ Update, based on the recipient address identified in the field of the outer │
│ IP header, the outer IP header of the packet to obtain an updated packet │──620
│ with an updated outer IP header, wherein the source address of the   │
│ updated outer IP header is updated to the tunnel endpoint associated │
│ with the intermediate network node, and the destination address of the │
│ updated outer IP header is updated to a tunnel endpoint associated with │
│ a receiving network node associated with the recipient address       │
└─────────────────────────────────────────────────────────────┘
                              │
                              ▼
┌─────────────────────────────────────────────────────────────┐
│ Route the updated packet according to the updated outer IP header │──630
└─────────────────────────────────────────────────────────────┘
```

FIG. 6

GRE TUNNELING WITH REDUCED PACKET ENCRYPTION AT INTERMEDIATE ROUTERS USING LOOSE SOURCE ROUTING

RELATED APPLICATION

This application is a continuation of U.S. patent application Ser. No. 16/577,538, filed Sep. 20, 2019 (now U.S. Pat. No. 10,805,210), which is incorporated herein by reference.

BACKGROUND

A network tunnel is a mechanism for secure transmission of private information through a public network in such a way that network devices of the public network are unaware of the private information. A tunneling protocol is a communications protocol that enables creation of a network tunnel. The tunneling protocol enables private information to be sent across a public network through a process called encapsulation.

SUMMARY

According to some implementations, a method may include receiving, by a network node, a packet having an inner internet protocol (IP) header and an outer IP header, wherein a source address of the inner IP header identifies a sender address, and a destination address of the inner IP header identifies a recipient address, wherein the inner IP header is encrypted, and wherein a source address of the outer IP header identifies a tunnel endpoint associated with a transmitting network node, a destination address of the outer IP header identifies a tunnel endpoint associated with the network node, and a loose source routing (LSR) field of the outer IP header identifies the recipient address; determining, by the network node and based on the recipient address identified in the LSR field of the outer IP header, a tunnel endpoint associated with a receiving network node; updating, by the network node, the outer IP header of the packet to obtain an updated packet with an updated outer IP header, wherein the source address of the updated outer IP header is updated to the tunnel endpoint associated with the network node, and the destination address of the updated outer IP header is updated to the tunnel endpoint associated with the receiving network node; and routing the updated packet according to the updated outer IP header.

According to some implementations, a network node may include one or more memories and one or more processors, communicatively coupled to the one or more memories, to: receive a packet having an inner IP header and an outer IP header, wherein a source address of the inner IP header identifies a sender address, and a destination address of the inner IP header identifies a recipient address, wherein the inner IP header is encapsulated by a Generic Routing Encapsulation (GRE) header, the GRE header is encapsulated by an Encapsulating Security Payload (ESP) header that provides encryption, and the ESP header is encapsulated by the outer IP header, wherein a source address of the outer IP header identifies a tunnel endpoint associated with a transmitting network node, a destination address of the outer IP header identifies a tunnel endpoint associated with the network node, and an LSR field of the outer IP header identifies the recipient address; determine, based on the recipient address identified in the LSR field of the outer IP header, a tunnel endpoint associated with a receiving network node; update the outer IP header of the packet to obtain an updated packet with an updated outer IP header, wherein the source address of the updated outer IP header is updated to the tunnel endpoint associated with the network node, and the destination address of the updated outer IP header is updated to the tunnel endpoint associated with the receiving network node; and route the updated packet according to the updated outer IP header.

According to some implementations, a non-transitory computer-readable medium may store one or more instructions that, when executed by one or more processors, may cause the one or more processors to: receive a packet having an inner IP header and an outer IP header, wherein a source address of the inner IP header identifies a sender address, and a destination address of the inner IP header identifies a recipient address, wherein the inner IP header is encrypted, wherein a source address of the outer IP header identifies a tunnel endpoint associated with a transmitting network node, a destination address of the outer IP header identifies a tunnel endpoint associated with an intermediate network node, and a field of the outer IP header identifies the recipient address; update, based on the recipient address identified in the field of the outer IP header, the outer IP header of the packet to obtain an updated packet with an updated outer IP header, wherein the source address of the updated outer IP header is updated to the tunnel endpoint associated with the intermediate network node, and the destination address of the updated outer IP header is updated to a tunnel endpoint associated with a receiving network node associated with the recipient address; and route the updated packet according to the updated outer IP header.

BRIEF DESCRIPTION OF THE DRAWINGS

FIGS. 1A-1D are diagrams of one or more example implementations described herein.

FIGS. 4-6 are flowcharts of example processes for GRE tunneling with reduced packet encryption at intermediate routers using LSR.

DETAILED DESCRIPTION

Figure 1A:
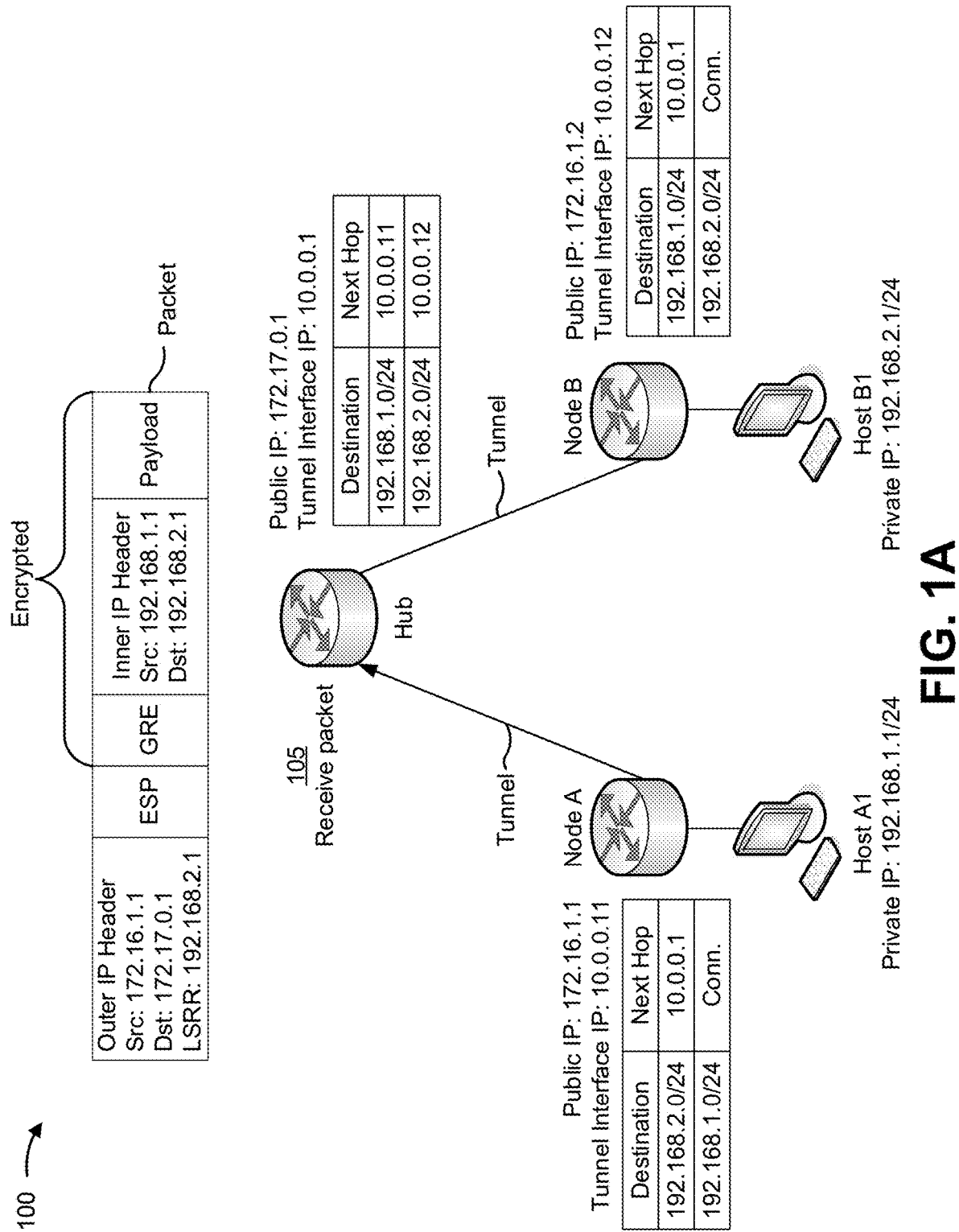

The following detailed description of example implementations refers to the accompanying drawings. The same reference numbers in different drawings may identify the same or similar elements.

A virtual private network (VPN) may be supported by a software-defined wide area network (SD-WAN) to extend a private network across a public network (e.g., the Internet). In particular, the VPN may establish a virtual point-to-point connection over the public network through use of a tunneling protocol. For example, GRE is a tunneling protocol that may be used to transport an IP packet with private addresses over the public network using a delivery packet with public IP addresses that represent GRE tunnel endpoints. The IP packet (e.g., the IP packet encapsulated within the delivery packet) may be encrypted by a transmitting network node and decrypted by a receiving network node using a secure network protocol suite, such as IP Security (IPSec).

In some instances, the delivery packet originating from the transmitting network node may be transported through a hub, or one or more other intermediate routers, before reaching the receiving network node. In such a case, according to current techniques, the transmitting network node may encrypt the IP packet with an encryption key negotiated with the hub, encapsulate the IP packet in a delivery packet addressed to the hub, and transmit the delivery packet to the hub. The hub may decapsulate the IP packet and decrypt the IP packet using a decryption key negotiated with the transmitting network node. Based on the decrypted IP packet, the hub may determine that a destination of the IP packet is behind the receiving network node. Accordingly, the hub may re-encrypt the IP packet using an encryption key negotiated with the receiving network node, re-encapsulate the IP packet with a delivery packet addressed to the receiving network node, and transmit the delivery packet to the receiving network node. The receiving network node may decapsulate the IP packet, decrypt the IP packet using a decryption key negotiated with the hub, and transmit the IP packet to the destination.

Accordingly, current techniques require one or more decryption, re-encryption, and re-encapsulation steps when transporting a packet through one or more intermediate routers (e.g., multiple intermediate routers would require multiple decryption, re-encryption, and re-encapsulation steps). This additional processing wastes computing resources (e.g., processor resources, memory resources, and/or the like) and causes network congestion, thereby reducing network throughput.

According to some implementations described herein, one or more intermediate network nodes (e.g., intermediate routers between a transmitting router and a receiving router) may process a packet originating at the transmitting network node and destined for the receiving network node without performing decryption, re-encryption, and re-encapsulation on the packet. In some implementations, an intermediate network node (e.g., an intermediate router) may receive a packet (e.g., a GRE packet), with an outer IP header that encapsulates an inner packet with an inner IP header. The outer IP header may use an option field (e.g., an LSR option field) to identify a destination of the packet indicated by the inner IP header. Based on the destination, the intermediate network node may update the outer IP header of the packet with addresses associated with the intermediate network node and the destination, to obtain an updated packet with an updated outer IP header. The network node may then route the updated packet according to the updated outer IP header.

In this way, the intermediate network node is able to process and route a packet without performing decryption, re-encryption, and re-encapsulation of the packet. By eliminating decryption, re-encryption, and re-encapsulation steps, the intermediate network node conserves computing resources that would otherwise be wasted performing decryption, re-encryption, and re-encapsulation. As a result, the intermediate network node facilitates faster routing of packets, which reduces network congestion and improves network throughput. Accordingly, significant reductions to network congestion and improvements to network throughput can be achieved when the intermediate network node is one of a plurality of intermediate network nodes through which a packet is transported.

FIGS. 1A-1D are diagrams of one or more example implementations 100 described herein. As shown in FIGS. 1A-1D, example implementation(s) 100 may include a transmitting network node (shown as Node A in FIGS. 1A and 1D), an intermediate network node (shown as Hub in FIGS. 1A-1D), and a receiving network node (shown as Node B in FIGS. 1A and 1D).

The transmitting network node (e.g., an ingress network node), the intermediate network node (e.g., a hub), and the receiving network node (e.g., an egress network node) may form a VPN. In some implementations, the VPN also may include one or more additional network nodes. The VPN may be associated with multiple local area networks (LANs). For example, each LAN may be associated with an office location of an entity. The transmitting network node may be a gateway to a first LAN that includes a sender host (shown as Host A1 in FIGS. 1A and 1D) and the receiving network node may be a gateway to a second LAN that includes a recipient host (shown as Host B1 in FIGS. 1A and 1D). The sender host may be associated with a private sender address (e.g., a private IP address) and the recipient host may be associated with a private recipient address (e.g., a private IP address).

A host may include a traffic transfer device, such as a router, a gateway, a switch, a firewall, a hub, a bridge, a reverse proxy, a server (e.g., a proxy server, a server executing a virtual machine, and/or the like), a security device, an intrusion detection device, a load balancer, or a similar type of device. In some implementations, a host may include an endpoint device that is a source or a destination for network traffic. For example, a host may include a computer or a similar type of device.

The transmitting network node may communicate with the receiving network node via the intermediate network node. That is, packets originating behind the transmitting network node and terminating behind the receiving network node may be transported through the intermediate network node. Thus, the intermediate network node may be an intermediate hop between the transmitting network node and the receiving network node. In some implementations, the intermediate network node may be one of a plurality of intermediate network nodes between the transmitting network node and the receiving network node. In some scenarios, packets may originate behind the intermediate network node and/or terminate behind the intermediate network node using the transmitting network node or the receiving network node as an intermediate hop. In other words, the transmitting network node, the intermediate network node, and the receiving network node may be nodes of a mesh network.

A point-to-point connection between the transmitting network node and the intermediate network node may be established using a network tunnel (e.g., a GRE tunnel), and a point-to-point connection between the receiving network node and the intermediate network node may be established using a network tunnel. Accordingly, the transmitting network node, the intermediate network node, and the receiving network node each may be associated with a tunnel interface address (e.g., a tunnel interface IP address) and a public address (e.g., a public IP address) configured for the tunnel interface that serves as a tunnel endpoint. While the description to follow will be in terms of an example of a GRE tunneling protocol, the description is not limited to this particular example. Implementations described herein also apply to other tunneling protocols that may be used to configure point-to-point connections over a public network.

In addition, the transmitting network node, the intermediate network node, and the receiving network node may share a common security association. For example, the VPN formed by the transmitting network node, the intermediate network node, and the receiving network node may be a group VPN. In a group VPN, a centralized key server may provide encryption and decryption keys to each group member (e.g., the transmitting network node, the intermediate network node, and the receiving network node) so that any group member may decrypt packets encrypted by any other group member. Accordingly, encryption and decryption keys used by the transmitting network node may correspond to (e.g., may be identical to) encryption and decryption keys used by the receiving network node (or the intermediate network node).

As shown in FIG. 1A, and by reference number 105, the intermediate network node may receive a packet. For example, the intermediate network node may receive a packet sent by the transmitting network node (shown as Node A in FIG. 1A). In such a case, the packet may have originated at a host (shown as Host A1 in FIG. 1A) behind the transmitting network node. For example, the host may have generated an IP packet and provided the IP packet to the transmitting network node, and the transmitting network node may have encapsulated the IP packet according to the GRE tunneling protocol based on determining that a destination for the IP packet was reachable via a GRE tunnel (e.g., according to a routing table of the transmitting network node).

Accordingly, the packet received by the intermediate network node may be a GRE packet. For example, the packet may include an outer IP header, and may encapsulate an inner packet (e.g., the IP packet) associated with an inner IP header and a payload (e.g., a payload intended for a host associated with a destination address of the inner IP header). Accordingly, the packet may include an inner IP header and an outer IP header.

The inner IP header may include a source address and a destination address. The source address of the inner IP header may identify a sender address (e.g., an IP address associated with a host that is sending the inner packet) and the destination address of the inner IP header may identify a recipient address (e.g., an IP address associated with a host that is to receive the inner packet). For example, when the packet is received by the intermediate network node from the transmitting network node, the source address of the inner IP header may identify a sender address associated with the sender host (e.g., 192.168.1.1, as shown in FIG. 1A) and the destination address of the inner IP header may identify a recipient address associated with the recipient host (e.g., 192.168.2.1, as shown in FIG. 1A). Thus, the source address and the destination address of the inner IP header may identify private IP addresses (e.g., private IP addresses associated with LANs).

The outer IP header also may include a source address and a destination address. The source address and the destination address of the outer IP header may identify respective tunnel endpoints (e.g., a source tunnel endpoint and a destination tunnel endpoint). For example, when the packet is received by the intermediate network node from the transmitting network node, the source address of the outer IP header may identify a tunnel endpoint associated with the transmitting network node (e.g., 172.16.1.1, as shown in FIG. 1A) and the destination address of the outer IP header may identify a tunnel endpoint associated with the intermediate network node (e.g., 172.17.0.1, as shown in FIG. 1A). Thus, the source address and the destination address of the outer IP header may identify public IP addresses.

In addition, the outer IP header may identify the recipient address indicated by the inner IP header (e.g., indicated by the destination address of the inner IP header). In some implementations, an option field of the outer IP header may identify the recipient address indicated by the inner IP header. The option field may be an LSR option field (i.e., an option field relating to LSR). For example, the option field may be a loose source and record route (LSRR) option field. In some implementations, the outer IP header may provide an indication that the option field identifies the recipient address indicated by the inner IP header. For example, the outer IP header may provide an indication that an LSR option field is not being used for LSR information and/or an indication that the LSR option field is being used to identify the recipient address indicated by the inner IP header. The indication may be provided by a flag of the outer IP header (e.g., another option field of the outer IP header, such as a reserved field, may be used as the flag).

When the packet is received by the intermediate network node from the transmitting network node, the inner packet, including the inner IP header, may be encrypted. For example, the transmitting network node may have encrypted the inner packet based on an encryption key. Moreover, the transmitting network node may have encrypted the inner packet using an ESP protocol (e.g., group VPN in transport mode). Accordingly, when the packet is received by the intermediate network node from the transmitting network node, the packet may include an ESP header that provides encryption to the inner packet, including the inner IP header. In such a case, the inner IP header may be encapsulated by a GRE header, the GRE header may be encapsulated by the ESP header, and the ESP header may be encapsulated by the outer IP header.

In some implementations, prior to receiving the packet from the transmitting network node, the intermediate network node may have received an encryption key and a decryption key from the centralized key server (e.g., a centralized key server associated with the group VPN that includes the transmitting network node, the intermediate network node, and the receiving network node). Additionally, the transmitting network node (e.g., prior to transmitting the packet) and the receiving network node (e.g., prior to receiving the packet) each may have received, from the centralized key server, an encryption key and a decryption key that correspond to the encryption key and the decryption key received by the intermediate network node. In other words, an encryption key and a decryption key associated with a tunnel between the transmitting network node and the intermediate network node may correspond to an encryption key and a decryption key associated with a tunnel between the receiving network node and the intermediate network node. In this way, a packet encrypted by any of the transmitting network node, the intermediate network node, and the receiving network node can be decrypted by any other of the transmitting network node, the intermediate network node, and the receiving network node. For example, a packet encrypted by the transmitting network node may be decrypted by the receiving network node.

Figure 1B:
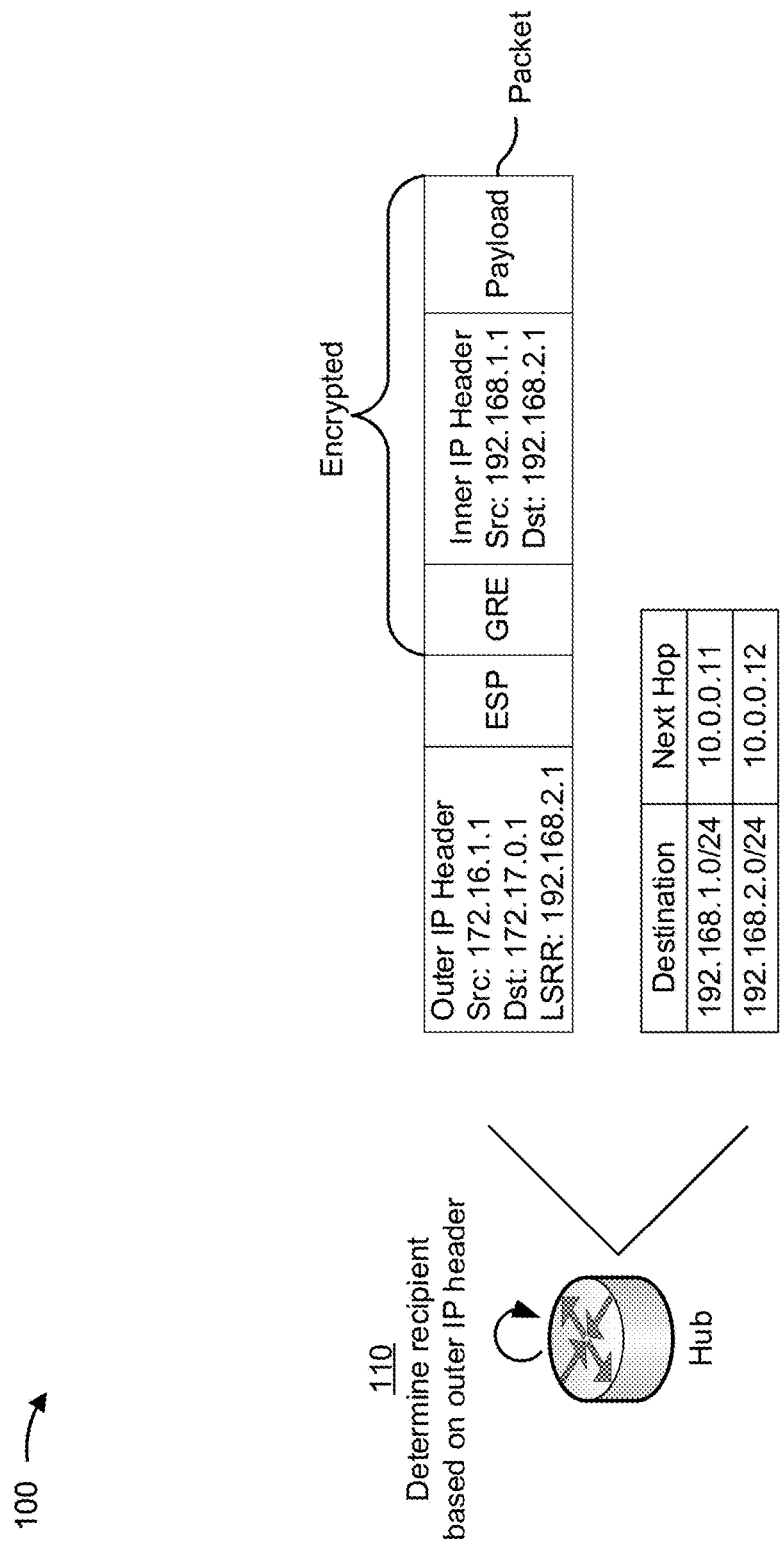

As shown by FIG. 1B, and by reference number 110, the intermediate network node (e.g., the hub) may attempt to determine a next hop network node for the packet based on the outer IP header. In particular, the intermediate network node may identify (e.g., based on a flag of the outer IP header) that an option field (e.g., an LSR option field, such as the LSRR option field) of the outer IP header identifies the recipient address, and may attempt to determine a next hop network node for the packet based on the recipient address identified by the option field of the outer IP header. For example, based on the recipient address identified by the option field of the outer IP header, the intermediate network node may attempt to determine a next hop network node for reaching the recipient address by referencing a routing table of the intermediate network node.

Figure 1D:
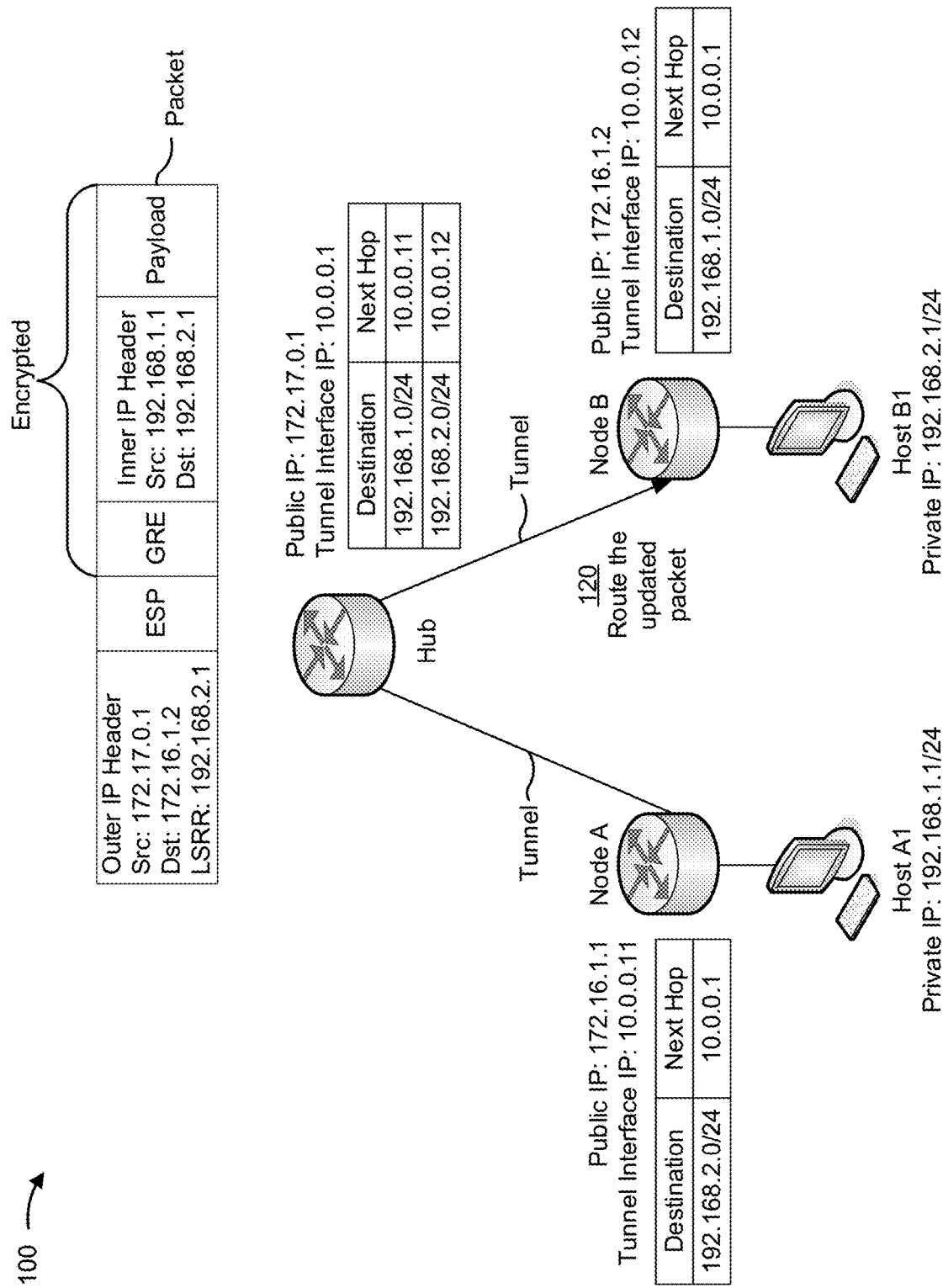

In some implementations, the intermediate network node may determine that there is a next hop network node for reaching the recipient address when the routing table identifies that the recipient address is reachable via a GRE tunnel interface. In such a case, the intermediate network node may determine the next hop network node based on the routing table (e.g., based on the GRE tunnel interface). As an example, the recipient address may be associated with a host (shown as Host B1 in FIGS. 1A and 1D) behind the receiving network node, and the intermediate network node may determine, using the routing table, that the host is reachable via a tunnel having a tunnel interface (e.g., 10.0.0.12) and a tunnel endpoint (e.g., 172.16.1.2, as shown in FIGS. 1A and 1D) associated with the receiving network node.

In some implementations, the intermediate network node may identify that the packet is encrypted (e.g., identify that the packet includes an ESP header). In such a case, the intermediate network node may ordinarily decrypt the packet to identify a recipient address for the inner packet. However, based on identifying that an option field (e.g., an LSR option field, such as the LSRR option field) of the outer IP header identifies the recipient address, the intermediate network node may determine to update the outer IP header rather than decrypting the packet.

As shown by FIG. 1C, and by reference number 115, the intermediate network node may update the outer IP header of the packet based on the determined next hop network node. The intermediate network node may update the source address of the outer IP header of the packet to a tunnel endpoint associated with the intermediate network node (e.g., 172.17.0.1, as shown in FIGS. 1A and 1D). The intermediate network node may update the destination address of the outer IP header of the packet to a tunnel endpoint associated with the determined next hop network node. For example, the intermediate network node may update the destination address of the outer IP header of the packet to a tunnel endpoint associated with the receiving network node (e.g., 172.16.1.2, as shown in FIGS. 1A and 1D) based on determining that the receiving network node is a next hop network node for reaching the recipient address identified by the option field of the outer IP header, as described above. In some implementations, the intermediate network node does not update the recipient address identified by the option field of the outer IP header when updating the source address and the destination address of the outer IP header.

In this way, the intermediate network node may obtain an updated packet that is the same as the packet originally received from the transmitting network node except for an updated outer IP header. Accordingly, the updated packet remains encapsulated and encrypted according to processing performed by the transmitting network node, thereby eliminating a need for the intermediate network node to perform decryption, re-encryption, and re-encapsulation, and conserving associated computing resources that would otherwise be wasted.

In some implementations, the intermediate network node may update a checksum value of the outer IP header of the packet based on the updated source address and destination address. In some implementations, rather than updating the outer IP header of the packet, the intermediate network node may copy the packet and update an outer IP header of the copied packet.

As shown by FIG. 1D, and by reference number 120, the intermediate network node may route the updated packet. That is, the intermediate network node may route the updated packet according to the updated outer IP header of the updated packet. For example, the intermediate network node may route the updated packet to the receiving network node based on the destination address of the updated outer IP header, which was updated to identify the tunnel endpoint associated with the receiving network node.

When the updated packet is received by the receiving network node, the receiving network node may attempt to determine a next hop network node for the packet based on the outer IP header, in a manner similar to that described above. For example, based on the recipient address identified by the option field of the outer IP header, the receiving network node may attempt to determine a next hop network node for reaching the recipient address by referencing a routing table of the receiving network node, in a manner similar to that described above.

In some implementations, the receiving network node, based on the routing table, may determine that there is not a next hop network node for the packet. For example, the routing table of the receiving network node may indicate that the recipient address is associated with a physical interface. Accordingly, the receiving network node may determine that the packet is destined for a host behind the receiving network node (e.g., destined for the LAN of the receiving network node). In such cases, the receiving network node may perform decryption on the updated packet by decapsulating the inner packet, and performing decryption on the inner packet. The receiving network node may decrypt the inner packet using a decryption key received from the centralized key server (e.g., a decryption key that corresponds to an encryption key used by the transmitting network node). After decrypting the inner packet, the receiving network node may forward the inner packet to a host associated with the recipient address (e.g., Host B1, as shown in FIG. 1D).

In some implementations, the receiving network node, based on the routing table, may determine that there is a next hop network node for the packet, in a manner similar to that described above. Accordingly, the receiving network node may update the source address and the destination address of the outer IP header of the updated packet to obtain a further updated packet, and route the further updated packet according to the outer IP header, in a manner similar to that described above. This process may be repeated at one or more intermediate network nodes until the further updated packet reaches an egress network node associated with the recipient address.

In this way, decryption, re-encryption, and re-encapsulation steps that would otherwise be performed by intermediate network nodes can be eliminated. Accordingly, intermediate network nodes can process packets with improved speed and efficiency, thereby reducing network congestion and improving network throughput.

As indicated above, FIGS. 1A-1D are provided merely as one or more examples. Other examples may differ from what is described with regard to FIGS. 1A-1D.

Figure 2:
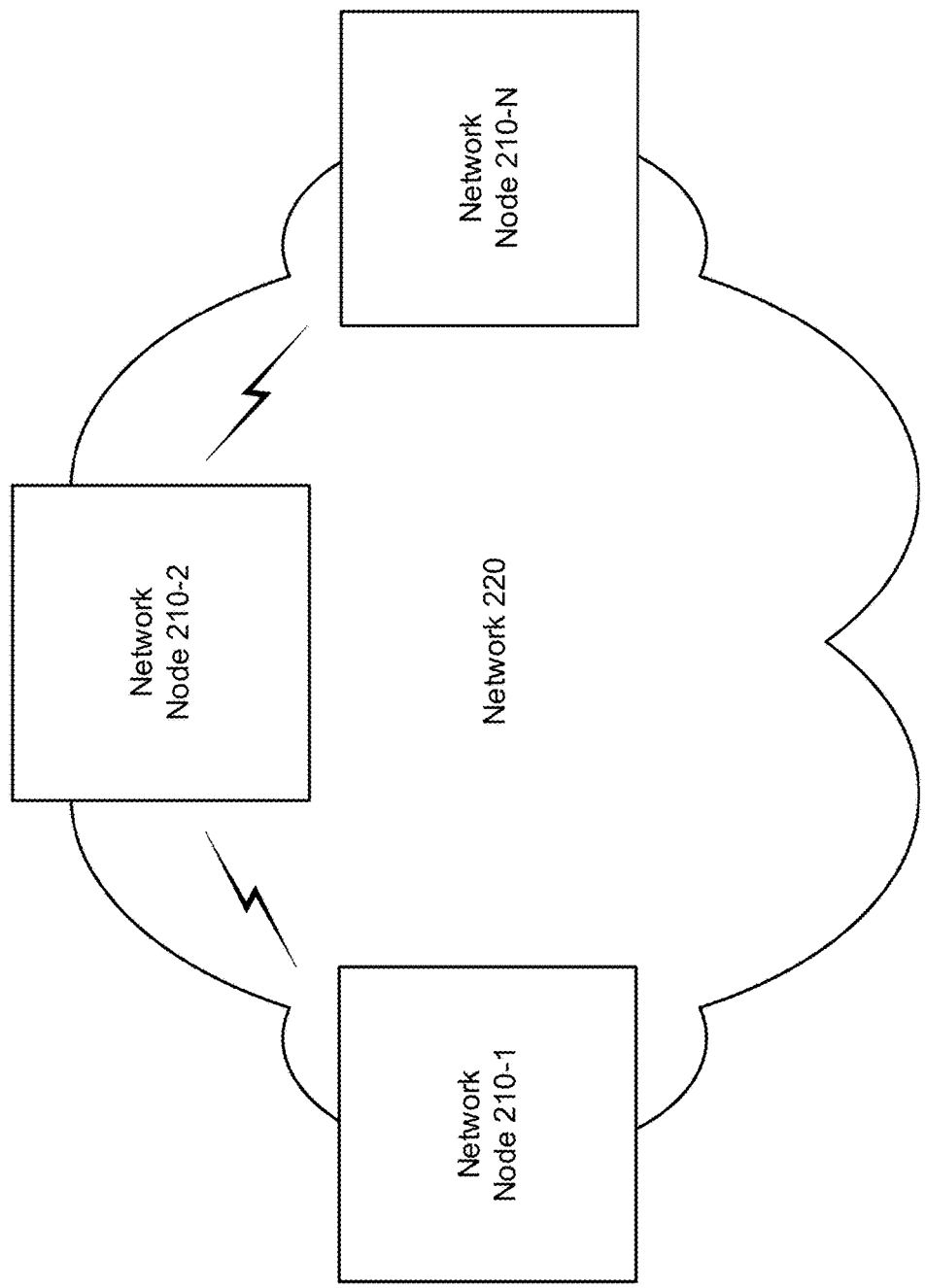
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more network nodes 210-1 through 210-N (N≥3) (hereinafter referred to collectively as "network nodes 210," and individually as "network node 210") and a network 220. Devices of environment 200 may interconnect via wired connections, wireless connections, or a combination of wired and wireless connections.

Network node 210 includes one or more devices capable of receiving, providing, storing, generating, and/or processing information. In some implementations, network node 210 may include a firewall, a router, a gateway, a switch, a bridge, a wireless access point, a base station (e.g., eNodeB, NodeB, gNodeB, and/or the like), and/or the like. In some implementations, network node 210 may be implemented as a physical device implemented within a housing, such as a chassis. In some implementations, network node 210 may be implemented as a virtual device implemented by one or more computer devices of a cloud computing environment or a data center. In some implementations, network node 210 may correspond to a transmitting network node, an intermediate network node, and/or a receiving network node. In some implementations, network nodes 210 may form a VPN, such as a group VPN.

In some implementations, a first network node 210 may process a packet received from a second network node 210. For example, the first network node 210 may determine a next hop network node 210 for the packet based on a recipient address identified in an option field of an outer IP header of the packet, update the outer IP header of the packet based on the determined next hop network node 210 to obtain an updated packet, and/or route the updated packet to the next hop network node 210.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of cellular network, and/or the like), a public land mobile network (PLMN), a LAN, a wide area network (WAN), a metropolitan area network (MAN), a telephone network (e.g., a public switched telephone network (PSTN)), a private network, an ad hoc network, an intranet, the Internet, a fiber optic-based network, a cloud computing network, or the like, and/or a combination of these or other types of networks.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
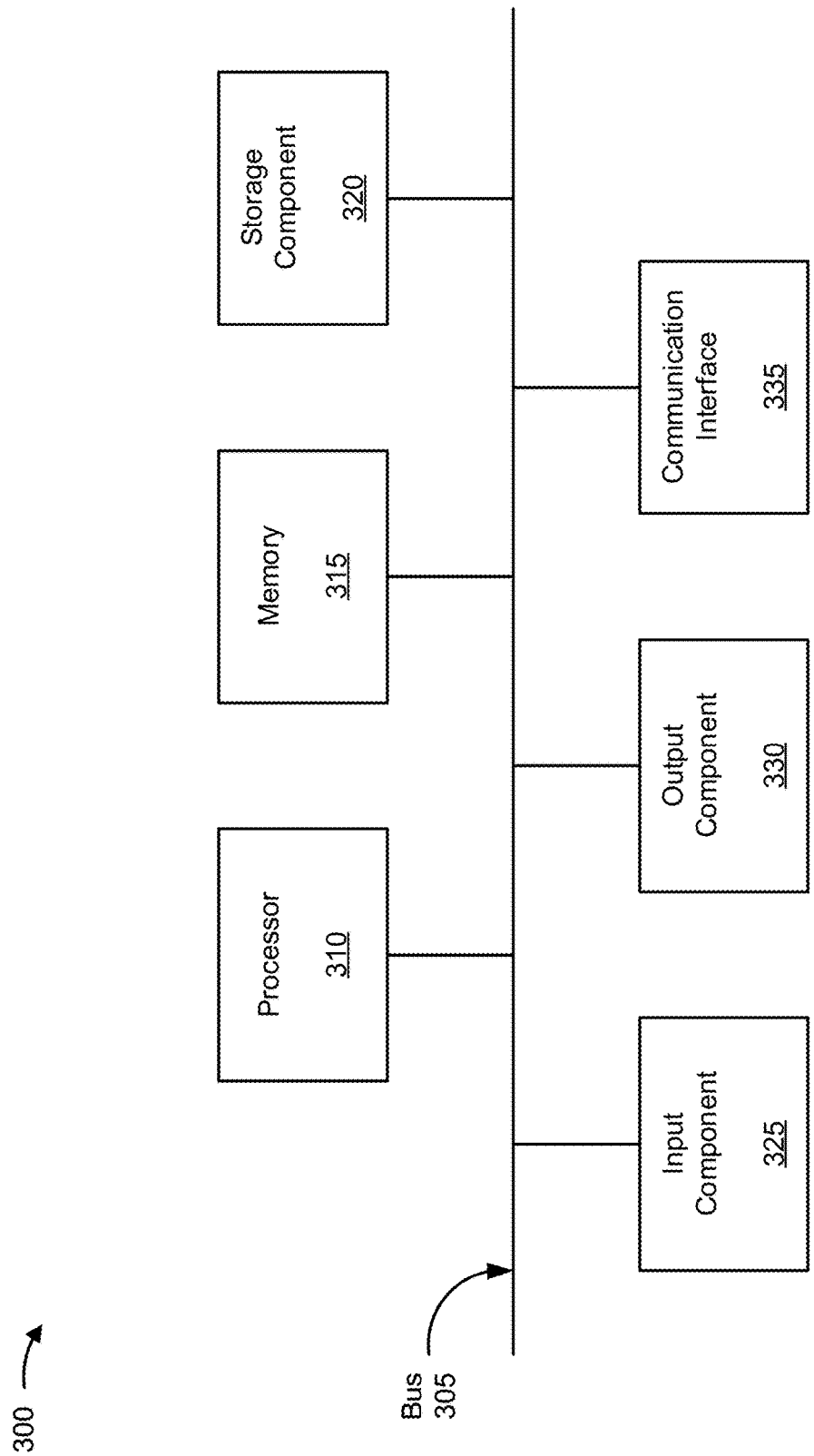
FIGS. 3A and 3B are diagrams of example components of one or more devices of FIG. 2.
Figure 3B:
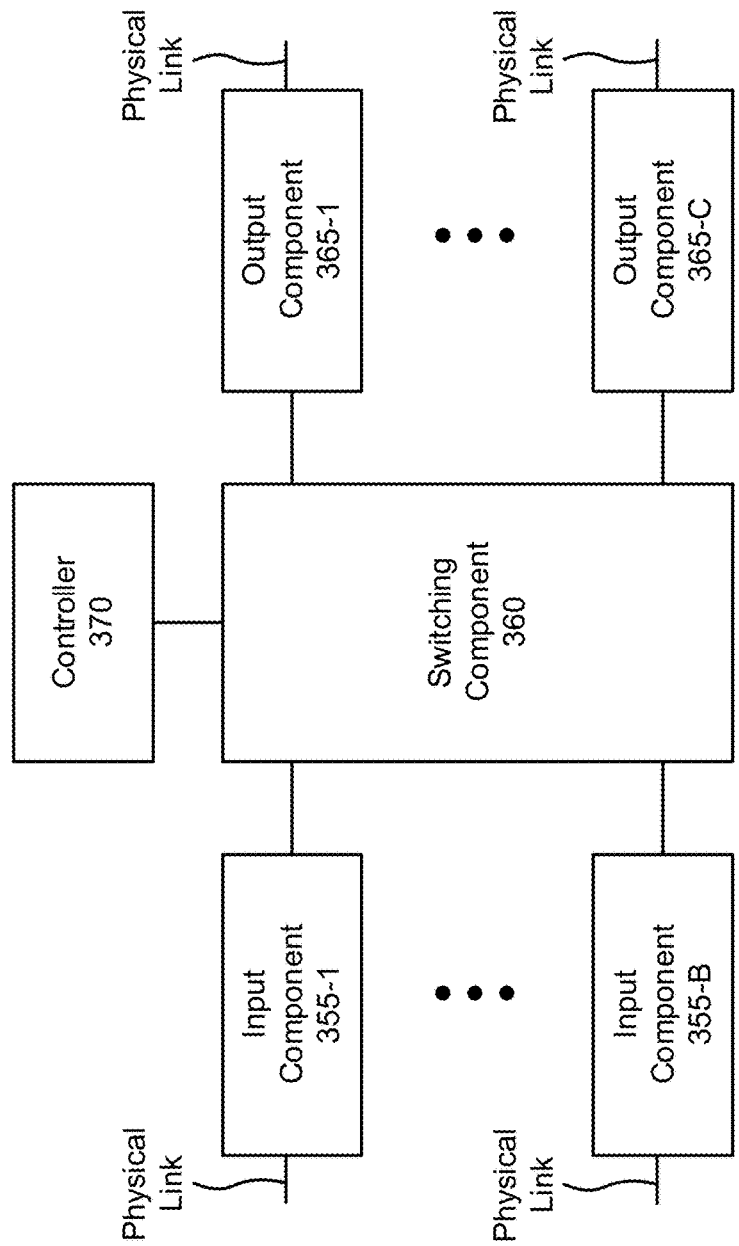

FIGS. 3A and 3B are diagrams of example components of one or more devices of FIG. 2. FIG. 3A is a diagram of example components of a device 300. Device 300 may correspond to network node 210 and/or the like. In some implementations, network node 210 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to network node 210 and/or the like. In some implementations, network node 210 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

FIG. 4 is a flow chart of an example process 400 for GRE tunneling with reduced packet encryption at intermediate routers using LSR. In some implementations, one or more process blocks of FIG. 4 may be performed by a network node (e.g., network node 210). For example, one or more process blocks of FIG. 4 may be performed by one or more intermediate network nodes (e.g., one or more intermediate network nodes between a transmitting network node and a receiving network node). In some implementations, one or more process blocks of FIG. 4 may be performed by another device or a group of devices separate from or including the network node.

As shown in FIG. 4, process 400 may include receiving a packet having an inner IP header and an outer IP header, wherein a source address of the inner IP header identifies a sender address, and a destination address of the inner IP header identifies a recipient address, wherein the inner IP header is encrypted, and wherein a source address of the outer IP header identifies a tunnel endpoint associated with a transmitting network node, a destination address of the outer IP header identifies a tunnel endpoint associated with an intermediate network node, and an LSR field of the outer IP header identifies the recipient address (block 410). For example, the network node (e.g., using processor 310, input component 325, communication interface 335, input component 355, switching component 360, controller 370, and/ or the like) may receive a packet having an inner IP header and an outer IP header, as described above. In some implementations, a source address of the inner IP header identifies a sender address, and a destination address of the inner IP header identifies a recipient address. In some implementations, the inner IP header is encrypted. In some implementations, a source address of the outer IP header identifies a tunnel endpoint associated with a transmitting network node, a destination address of the outer IP header identifies a tunnel endpoint associated with an intermediate network node, and an LSR field of the outer IP header identifies the recipient address.

As further shown in FIG. 4, process 400 may include determining, based on the recipient address identified in the LSR field of the outer IP header, a tunnel endpoint associated with a receiving network node (block 420). For example, the network node (e.g., using processor 310, controller 370, and/or the like) may determine, based on the recipient address identified in the LSR field of the outer IP header, a tunnel endpoint associated with a receiving network node, as described above.

As further shown in FIG. 4, process 400 may include updating the outer IP header of the packet to obtain an updated packet with an updated outer IP header, wherein the source address of the updated outer IP header is updated to the tunnel endpoint associated with the intermediate network node, and the destination address of the updated outer IP header is updated to the tunnel endpoint associated with the receiving network node (block 430). For example, the network node (e.g., using processor 310, memory 315, storage component 320, switching component 360, controller 370, and/or the like) may update the outer IP header of the packet to obtain an updated packet with an updated outer IP header, as described above. In some implementations, the source address of the updated outer IP header is updated to the tunnel endpoint associated with the intermediate network node, and the destination address of the updated outer IP header is updated to the tunnel endpoint associated with the receiving network node.

As further shown in FIG. 4, process 400 may include routing the updated packet according to the updated outer IP header (block 440). For example, the network node (e.g., using processor 310, output component 330, communication interface 335, switching component 360, output component 365, controller 370, and/or the like) may route the updated packet according to the updated outer IP header, as described above.

Process 400 may include additional implementations, such as any single implementation or any combination of implementations described below and/or in connection with one or more other processes described elsewhere herein.

In a first implementation, the intermediate network node, the transmitting network node, and the receiving network node are associated with a VPN. In a second implementation, alone or in combination with the first implementation, the transmitting network node and the intermediate network node are associated with a first GRE tunnel and the receiving network node and the intermediate network node are associated with a second GRE tunnel.

In a third implementation, alone or in combination with one or more of the first and second implementations, the inner IP header is associated with an inner packet of the packet, and the inner packet has a payload intended for the recipient address. In a fourth implementation, alone or in combination with one or more of the first through third implementations, the tunnel endpoint associated with the transmitting network node and the tunnel endpoint associated with the receiving network node are public addresses, and the sender address and the recipient address are private addresses.

In a fifth implementation, alone or in combination with one or more of the first through fourth implementations, process 400 further includes receiving, prior to receiving the packet, an encryption key and a decryption key from a key server, and the encryption key and the decryption key correspond to an encryption key and a decryption key received by the transmitting network node and the receiving network node. In a sixth implementation, alone or in combination with one or more of the first through fifth implementations, encryption of the inner IP header was performed by the transmitting network node, and the transmitting network node and the receiving network node share a security association that permits the receiving network node to decrypt the inner IP header.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for GRE tunneling with reduced packet encryption at intermediate routers using LSR. In some implementations, one or more process blocks of FIG. 5 may be performed by a network node (e.g., network node 210). For example, one or more process blocks of FIG. 5 may be performed by one or more intermediate network nodes (e.g., one or more intermediate network nodes between a transmitting network node and a receiving network node). In some implementations, one or more process blocks of FIG. 5 may be performed by another device or a group of devices separate from or including the network node.

As shown in FIG. 5, process 500 may include receiving a packet having an inner IP header and an outer IP header, wherein a source address of the inner IP header identifies a sender address, and a destination address of the inner IP header identifies a recipient address, wherein the inner IP header is encapsulated by a GRE header, the GRE header is encapsulated by an ESP header that provides encryption, and the ESP header is encapsulated by the outer IP header, and wherein a source address of the outer IP header identifies a tunnel endpoint associated with a transmitting network node, a destination address of the outer IP header identifies a tunnel endpoint associated with an intermediate network node, and an LSR field of the outer IP header identifies the recipient address (block 510). For example, the network node (e.g., using processor 310, input component 325, communication interface 335, input component 355, switching component 360, controller 370, and/or the like) may receive a packet having an inner IP header and an outer IP header, as described above. In some implementations, a source address of the inner IP header identifies a sender address, and a destination address of the inner IP header identifies a recipient address. In some implementations, the inner IP header is encapsulated by a GRE header, the GRE header is encapsulated by an ESP header that provides encryption, and the ESP header is encapsulated by the outer IP header. In some implementations, a source address of the outer IP header identifies a tunnel endpoint associated with a transmitting network node, a destination address of the outer IP header identifies a tunnel endpoint associated with an intermediate network node, and an LSR field of the outer IP header identifies the recipient address.

As further shown in FIG. 5, process 500 may include determining, based on the recipient address identified in the LSR field of the outer IP header, a tunnel endpoint associated with a receiving network node (block 520). For example, the network node (e.g., using processor 310, controller 370, and/or the like) may determine, based on the recipient address identified in the LSR field of the outer IP header, a tunnel endpoint associated with a receiving network node, as described above.

As further shown in FIG. 5, process 500 may include updating the outer IP header of the packet to obtain an updated packet with an updated outer IP header, wherein the source address of the updated outer IP header is updated to the tunnel endpoint associated with the intermediate network node, and the destination address of the updated outer IP header is updated to the tunnel endpoint associated with the receiving network node (block 530). For example, the network node (e.g., using processor 310, memory 315, storage component 320, switching component 360, controller 370, and/or the like) may update the outer IP header of the packet to obtain an updated packet with an updated outer IP header, as described above. In some implementations, the source address of the updated outer IP header is updated to the tunnel endpoint associated with the intermediate network node, and the destination address of the updated outer IP header is updated to the tunnel endpoint associated with the receiving network node.

As further shown in FIG. 5, process 500 may include routing the updated packet according to the updated outer IP header (block 540). For example, the network node (e.g., using processor 310, output component 330, communication interface 335, switching component 360, output component 365, controller 370, and/or the like) may route the updated packet according to the updated outer IP header, as described above.

Process 500 may include additional implementations, such as any single implementation or any combination of implementations described below and/or in connection with one or more other processes described elsewhere herein.

In a first implementation, the tunnel endpoint associated with the transmitting network node, the tunnel endpoint associated with the intermediate network node, and the tunnel endpoint associated with the receiving network node are GRE tunnel endpoints. In a second implementation, alone or in combination with the first implementation, the intermediate network node, the transmitting network node, and the receiving network node are associated with a VPN. In a third implementation, alone or in combination with one or more of the first and second implementations, the intermediate network node, the transmitting network node, and the receiving network node are associated with a group VPN.

In a fourth implementation, alone or in combination with one or more of the first through third implementations, encryption of the inner IP header was performed by the transmitting network node, and the transmitting network node and the receiving network node share a security association that permits the receiving network node to decrypt the inner IP header.

In a fifth implementation, alone or in combination with one or more of the first through fourth implementations, the LSR field is an LSRR field. In a sixth implementation, alone or in combination with one or more of the first through fifth implementations, the outer IP header provides an indication that the LSR field identifies the recipient address.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for GRE tunneling with reduced packet encryption at intermediate routers using LSR. In some implementations, one or more process blocks of FIG. 6 may be performed by a network node (e.g., network node 210). For example, one or more process blocks of FIG. 6 may be performed by one or more intermediate network nodes (e.g., one or more intermediate network nodes between a transmitting network node and a receiving network node). In some implementations, one or more process blocks of FIG. 6 may be performed by another device or a group of devices separate from or including the network node.

As shown in FIG. 6, process 600 may include receiving a packet having an inner IP header and an outer IP header, wherein a source address of the inner IP header identifies a sender address, and a destination address of the inner IP header identifies a recipient address, wherein the inner IP header is encrypted, and wherein a source address of the outer IP header identifies a tunnel endpoint associated with a transmitting network node, a destination address of the outer IP header identifies a tunnel endpoint associated with an intermediate network node, and a field of the outer IP header identifies the recipient address (block 610). For example, the network node (e.g., using processor 310, input component 325, communication interface 335, input component 355, switching component 360, controller 370, and/or the like) may receive a packet having an inner IP header and an outer IP header, as described above. In some implementations, a source address of the inner IP header identifies a sender address, and a destination address of the inner IP header identifies a recipient address. In some implementations, the inner IP header is encrypted. In some implementations, a source address of the outer IP header identifies a tunnel endpoint associated with a transmitting network node, a destination address of the outer IP header identifies a tunnel endpoint associated with an intermediate network node, and a field of the outer IP header identifies the recipient address.

As further shown in FIG. 6, process 600 may include updating, based on the recipient address identified in the field of the outer IP header, the outer IP header of the packet to obtain an updated packet with an updated outer IP header, wherein the source address of the updated outer IP header is updated to the tunnel endpoint associated with the intermediate network node, and the destination address of the updated outer IP header is updated to a tunnel endpoint associated with a receiving network node associated with the recipient address (block 620). For example, the network node (e.g., using processor 310, memory 315, storage component 320, switching component 360, controller 370, and/or the like) may update, based on the recipient address identified in the field of the outer IP header, the outer IP header of the packet to obtain an updated packet with an updated outer IP header, as described above. In some implementations, the source address of the updated outer IP header is updated to the tunnel endpoint associated with the intermediate network node, and the destination address of the updated outer IP header is updated to a tunnel endpoint associated with a receiving network node associated with the recipient address.

As further shown in FIG. 6, process 600 may include routing the updated packet according to the updated outer IP header (block 630). For example, the network node (e.g., using processor 310, output component 330, communication interface 335, switching component 360, output component 365, controller 370, and/or the like) may route the updated packet according to the updated outer IP header, as described above.

Process 600 may include additional implementations, such as any single implementation or any combination of implementations described below and/or in connection with one or more other processes described elsewhere herein.

In a first implementation, the inner IP header is encapsulated by a GRE header, the GRE header is encapsulated by an ESP header that provides encryption, and the ESP header is encapsulated by the outer IP header. In a second implementation, alone or in combination with the first implementation, the tunnel endpoint associated with the transmitting network node, the tunnel endpoint associated with the intermediate network node, and the tunnel endpoint associated with the receiving network node are GRE tunnel endpoints.

In a third implementation, alone or in combination with one or more of the first and second implementations, the transmitting network node and the intermediate network node are associated with a first tunnel and the receiving network node and the intermediate network node are associated with a second tunnel, and a decryption key and an encryption key associated with the first tunnel correspond to a decryption key and an encryption key associated with the second tunnel.

In a fourth implementation, alone or in combination with one or more of the first through third implementations, the field is an LSRR field. In a fifth implementation, alone or in combination with one or more of the first through fourth implementations, the outer IP header provides an indication that the field identifies the recipient address.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 receiving, by a network node, a packet that includes an outer header,
  wherein a source address of the outer header identifies a tunnel endpoint associated with a transmitting network node, and a destination address of the outer header identifies a tunnel endpoint associated with the network node,
  wherein a loose source routing (LSR) field of the outer header identifies a recipient address;
 updating, by the network node, the outer header of the packet to obtain an updated packet with an updated outer header,
  wherein the source address of the updated outer header is updated to the tunnel endpoint associated with the network node, and the destination address of the updated outer header is updated to a tunnel endpoint associated with a receiving network node; and
 routing, by the network node, the updated packet according to the updated outer header.

2. The method of claim 1, further comprising:
 determining a next hop network node for the packet to reach a recipient address by referencing a routing table of an intermediate network node based on the recipient address identified by an option field of the outer header; and
 wherein updating the outer header of the packet comprises:
  updating the outer header of the packet based on determining the next hop network node.

3. The method of claim 1, wherein the packet includes an an inner header that is an IP address.

4. The method of claim 1, wherein the packet includes an inner header that is encapsulated by a Generic Routing Encapsulation (GRE) header and the GRE header is encapsulated by an Encapsulating Security Payload (ESP) header that provides encryption.

5. The method of claim 1, wherein receiving the packet comprises:
   receiving the packet from the transmitting network node,
      the transmitting network node having encapsulated the packet according to a Generating Routing Encapsulation (GRE) tunneling protocol based on determining that a destination for the packet was reachable via a GRE tunnel.

6. The method of claim 1, wherein the packet is encrypted, and
   wherein the method further comprises:
      decrypting the packet to identify a recipient address.

7. A network node, comprising:
   one or more memories; and
   one or more processors, communicatively coupled to the one or more memories, to:
      receive a packet that includes an outer header,
         wherein a source address of the outer header identifies a tunnel endpoint associated with a transmitting network node, and a destination address of the outer header identifies a tunnel endpoint associated with the network node, and
         wherein a loose source routing (LSR) field of the outer header identifies a recipient address;
      update the outer header of the packet to obtain an updated packet with an updated outer header,
         wherein the source address of the updated outer header is updated to the tunnel endpoint associated with the network node, and the destination address of the updated outer header is updated to a tunnel endpoint associated with a receiving network node; and
      route the updated packet according to the updated outer header.

8. The network node of claim 7, wherein the one or more processors are further to:
   determine a next hop network node for the packet to reach a recipient address by referencing a routing table of an intermediate network node based on the recipient address identified by an option field of the outer header; and
   wherein the one or more processors, when updating the outer header of the packet, are to:
      update the outer header of the packet based on determining the next hop network node.

9. The network node of claim 7, wherein the network node, the transmitting network node, and the receiving network node are associated with a virtual private network (VPN).

10. The network node of claim 7, wherein the outer header is an IP address.

11. The network node of claim 7, wherein the one or more processors, when receiving the packet, are to:
   receive the packet from the transmitting network node,
      the transmitting network node having encapsulated the packet according to a Generating Routing Encapsulation (GRE) tunneling protocol based on determining that a destination for the packet was reachable via a GRE tunnel.

12. The network node of claim 7, wherein the packet is encrypted, and
   wherein the one or more processors are further to:
      decrypt the packet to identify a recipient address.

13. A non-transitory computer-readable medium storing instructions, the instructions comprising:
   one or more instructions that, when executed by one or more processors, cause the one or more processors to:
      receive a packet that includes an outer header,
         wherein a source address of the outer header identifies a tunnel endpoint associated with a transmitting network node, and a destination address of the outer header identifies a tunnel endpoint associated with the network node, and
         wherein a loose source routing (LSR) field of the outer header identifies a recipient address;
      update the outer header of the packet to obtain an updated packet with an updated outer header,
         wherein the source address of the updated outer header is updated to the tunnel endpoint associated with the network node, and the destination address of the updated outer header is updated to a tunnel endpoint associated with a receiving network node; and
      route the updated packet according to the updated outer header.

14. The non-transitory computer-readable medium of claim 13, wherein the one or more instructions, that further cause the one or more processors to:
   determine a next hop network node for the packet to reach a recipient address by referencing a routing table of an intermediate network node based on the recipient address identified by an option field of the outer header; and
   wherein the one or more instructions, that cause the one or more processors to update the outer header of the packet are to:
      update the outer header of the packet based on determining the next hop network node.

15. The non-transitory computer-readable medium of claim 13, wherein the network node, the transmitting network node, and the receiving network node are associated with a virtual private network.

16. The non-transitory computer-readable medium of claim 13, wherein the packet includes an inner header that is encapsulated by a Generic Routing Encapsulation (GRE) header and the GRE header is encapsulated by an Encapsulating Security Payload (ESP) header that provides encryption.

17. The non-transitory computer-readable medium of claim 13, wherein the one or more instructions, that further cause the one or more processors to:
   receive the packet from the transmitting network node,
      the transmitting network node having encapsulated the packet according to a Generating Routing Encapsulation (GRE) tunneling protocol based on determining that a destination for the packet was reachable via a GRE tunnel.

18. The method of claim 1, wherein the packet includes an inner header and the outer header,
   wherein a source address of the inner header identifies a sender address, and a destination address of the inner header identifies a recipient address.

19. The network node of claim 7, wherein the packet includes an inner header and the outer header,
   wherein a source address of the inner header identifies a sender address, and a destination address of the inner header identifies a recipient address.

20. The non-transitory computer-readable medium of claim 13, wherein the packet that includes an inner header and the outer header, wherein a source address of the inner header identifies a sender address, and a destination address of the inner header identifies a recipient address.

\* \* \* \* \*